United States Patent [19]

Keller et al.

[11] 4,452,125

[45] Jun. 5, 1984

[54] MANUAL-HYDRAULIC ACTUATOR

[75] Inventors: William F. Keller, West Covina; Richard D. Sibley, Anaheim, both of Calif.

[73] Assignee: Koso International, Inc., Santa Fe Springs, Calif.

[21] Appl. No.: 321,443

[22] Filed: Nov. 16, 1981

[51] Int. Cl.³ ............................................. F15B 13/10
[52] U.S. Cl. ............................... 91/189 A; 91/391 R; 74/424.8 VA; 74/625
[58] Field of Search ............. 91/391 R, 189 R, 189 A; 251/14; 74/625, 424.8 VA

[56] References Cited

U.S. PATENT DOCUMENTS

| | | | |
|---|---|---|---|
| 2,387,215 | 2/1943 | Fawkes | 91/391 R |
| 3,217,604 | 11/1965 | Knox | 91/391 R |
| 3,786,728 | 1/1974 | Sheesley et al. | 91/391 R |

OTHER PUBLICATIONS

Milliampere Hydramotor Actuator Manual; published by General Controls–International Telephone and Telegraph Corp.; 1977; pp. 1 through 16.
AH90 Series Milliampere Hydramotor Actuator; published by General Controls–International Telephone and Telegraph Corp.; 1977; pp. 1 through 10.

*Primary Examiner*—Paul E. Maslousky
*Attorney, Agent, or Firm*—William P. Green

[57] ABSTRACT

A manual actuator which enables manual operation of a valve, damper or other controlled element upon loss of hydraulic pressure in an associated electrohydraulic actuator assembly. The apparatus preferably includes nut segments which are automatically moved into engagement with a coacting threaded shaft upon loss of hydraulic pressure in the electrohydraulic device and which function when so engaged with the shaft to render a manual operating element effective to move the controlled part.

28 Claims, 5 Drawing Figures

FIG. 2B

MANUAL-HYDRAULIC ACTUATOR

BACKGROUND OF THE INVENTION

This invention relates to improved manual actuators for use in conjunction with automatic electrohydraulic devices for operating a valve, damper or other controlled element.

Powered actuators have been devised in the past for moving a controlled part within a predetermined range of movement in accordance with variations in an input signal delivered to the device. In some such arrangements, the power for moving the controlled element is supplied by a pressurized fluid, delivered by a pump or other pressure fluid source, and acting to move a power piston relative to a cylinder in correspondence with variations in an electrical control signal. An electrohydraulic actuator of this type is disclosed in our copending application Ser. No. 321,444 filed Nov. 16, 1981 on "Double Acting Linear Actuator".

SUMMARY OF THE INVENTION

The purpose of the present invention is to provide a manual actuator for permitting manual movement of a controlled part in the event of failure of fluid pressure in a power operated system of the above discussed general type. An actuator of the present invention is preferably maintained in an inactive condition during normal powered operation of the fluid pressure actuated system, and in that inactive condition is ineffective to move the controlled part. Upon failure of the fluid pressure source of the automatic power operating mechanism, the manual actuator is automatically converted from its inactive condition to an active operative condition in which it then permits manual displacement of the controlled element. Upon reestablishment of fluid pressure, the apparatus reverts back to a condition of powered operation in which the manual actuator is again ineffective to control the output part.

The conversion between active and inactive condition of the manual actuator is preferably attained by a releasable mechanical connection including at least one and preferably several threaded elements movable laterally into and out of engagement with another threaded part in a relation making and breaking the mechanical drive from the manual operating element to the controlled part. Desirably the movable threaded elements are nut segments which are cammed into and out of engagement with a coacting externally threaded screw or shaft by a piston system exposed and responsive to the pressure of pressure fluid from the main supply pump of the electrohydraulic powered system.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figures 1, 3, 4:
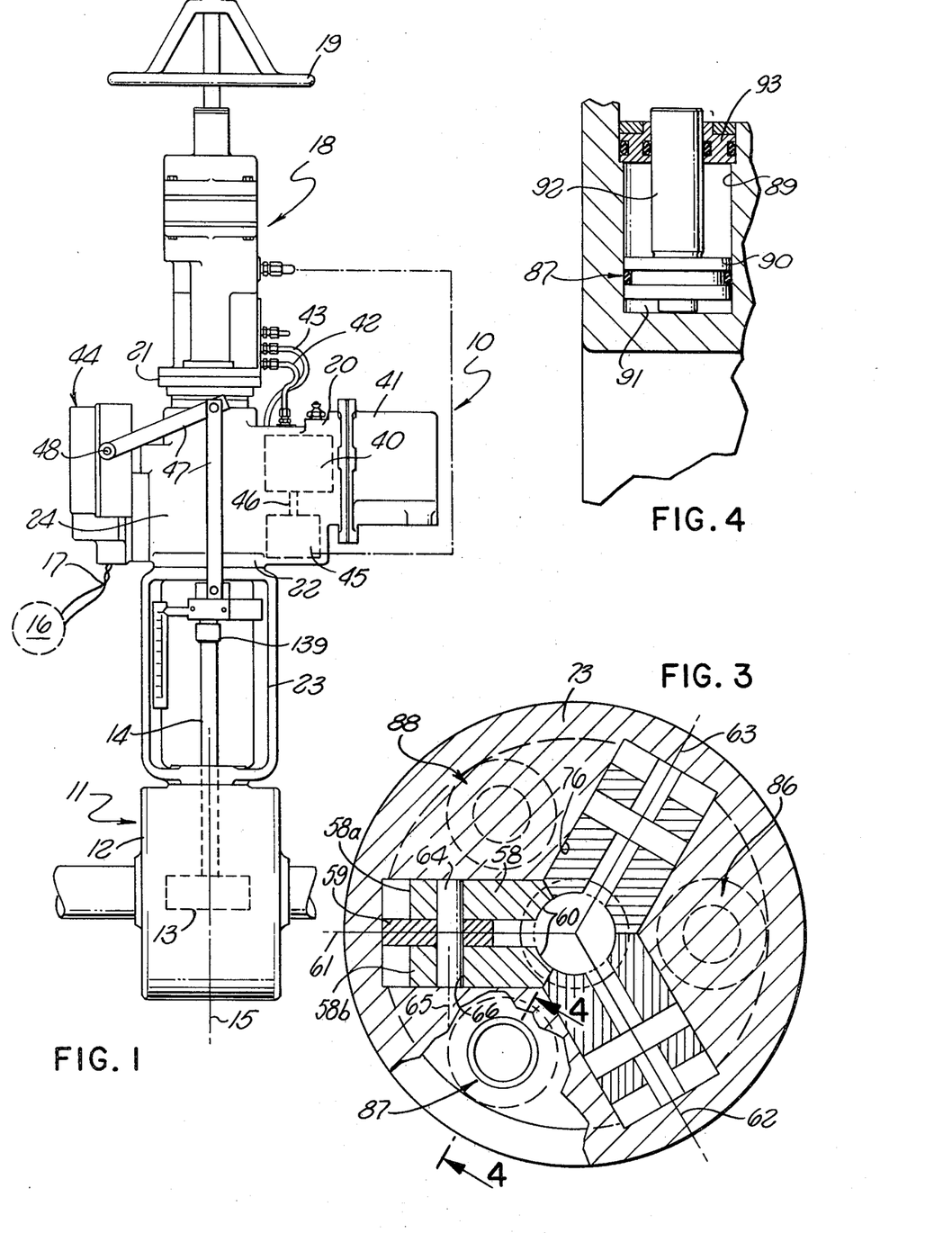
FIG. 1 is a side elevational view of an electrohydraulic actuator and associated manual actuator.
FIG. 3 is a transverse section taken on line 3—3 of FIG. 2.
FIG. 4 is a fragmentary axial section taken on line 4—4 of FIG. 3.

There is illustrated at 10 in FIG. 1 an automatic power operated electrohydraulic linear actuator which may typically correspond to the actuator shown and described in detail in our above identified copending U.S. patent application Ser. No. 321,444. This powered actuator is utilized for operating a controlled unit 11 which may typically be a valve assembly having its body 12 secured to the lower end of the electrohydraulic actuator 10 and containing a valve element 13 having a stem 14 which is movable upwardly and downwardly along a vertical axis 15 to control the fluid flow through the valve body. Actuator 10 moves valve 13 and its stem 14 to positions corresponding to the voltage of an electrical signal delivered to actuator 10 from a signal source 16 through conductors 17. The present invention is particularly concerned with the provision of a manual actuating mechanism 18 having a manually operated hand wheel 19 which automatically becomes effective to move valve 13 in the event of loss of fluid pressure in the powered actuator 10. The powered unit 10 includes a main housing structure 20 having an upper flange 21 to which manual actuating unit 18 is connected, and having a lower flange 22 to which there is secured a spider or frame part 23 carrying valve 11. A central portion 24 of the main body or housing of electrohydraulic actuator 10 contains a piston and cylinder mechanism 25 (FIG. 2B), including a cylinder 26 centered about the previously mentioned vertical axis 15, and a contained piston 27 which is reciprocable upwardly and downwardly along that axis within cylinder 26. The upper end of the cylinder may be closed by a top wall 28 forming a portion of the body 29 of the upper manual actuating mechanism 18, and having a flange 30 engaging and appropriately secured to cylinder 26 as by fasteners represented at 31. The piston rod 32 projects upwardly through a central passage 33 in top wall 28 of the cylinder, in sealed relation, and is utilized for manually actuating the piston when fluid pressure is lost. The piston 27 has a main externally cylindrical body part 34 on which an annular piston head 35 is carried, with seal elements 36 slidably engaging and sealed with respect to the inner wall of the cylinder. The annular chamber C1 beneath the head 35 of the piston is closed by a bottom wall structure 37, sealed to the piston and cylinder by rings 38. A rod 39 carried by the piston projects downwardly therefrom along axis 15, and is connectable at 139 to the valve stem 14. As will be apparent from FIG. 2B, the cross sectional area of bottom chamber C1 of the cylinder is smaller than the effective cross sectional area of upper chamber C2 (radially between the cylinder wall and rod 32), so that identical pressures in the two chambers will cause exertion of a greater downward than upward force on the piston and result in downward movement thereof. If the pressure in chamber C2 is at a predetermined value lower than the pressure in chamber C1, the upward and downward forces are balanced, to maintain the piston in a set position. Any variation of the pressure in chamber C2 above or beneath that predetermined value will cause either upward or downward actuation of the piston and connected valve.

Pressure fluid is supplied to the piston and cylinder mechanism 25 by a pump 40 contained within a side portion of the main body structure of unit 10, which pump is driven by an electric motor 41. The pump is of a positive displacement type delivering liquid at a predetermined constant rate through a discharge line 42 and a connected line 43 to the piston and cylinder mechanism 25 under the control of an automatic control assembly 44. Pump 40 takes suction from a sump or reservoir 45 through a suction line represented diagrammatically at 46.

It is contemplated that the automatic control means 44 may be of any known type capable of responding to electrical input signals in conductors 17 in a manner automatically controlling the delivery of pressurized hydraulic fluid from pump 40 to one or both of the upper and lower chambers C2 and C1 of piston and cylinder mechanism 25 and causing upward and downward movement of piston 27 in correspondence with variations in that signal. More particularly, automatic control unit 44 may respond to an increase in voltage in the signal in conductors 17 to cause movement of piston 27 along axis 15 in a predetermined direction, typically downwardly, and may respond to a decrease in signal voltage to cause movement of the piston in the opposite direction, with any particular input voltage being effective to actuate the piston to a predetermined corresponding position and then maintain the piston in that position until further variation in input voltage. A mechanical feedback linkage or mechanism 47 may be actuated by and respond to upward and downward movements of the piston, and deliver a mechanical feedback signal at 48 to the automatic control unit 44 causing it to halt movement of the piston when the piston has reached a proper desired setting corresponding to the input signal.

Though as indicated the automatic control unit 44 may be of any known type capable of functioning in the discussed general manner, this control apparatus and the remainder of the electrohydraulic actuator unit 10 preferably correspond to the arrangement described and illustrated in detail in our above mentioned copending application Ser. No. 321,444. This specification will not be complicated by a full description of the electrohydraulic actuator of that copending application.

Figure 2A:
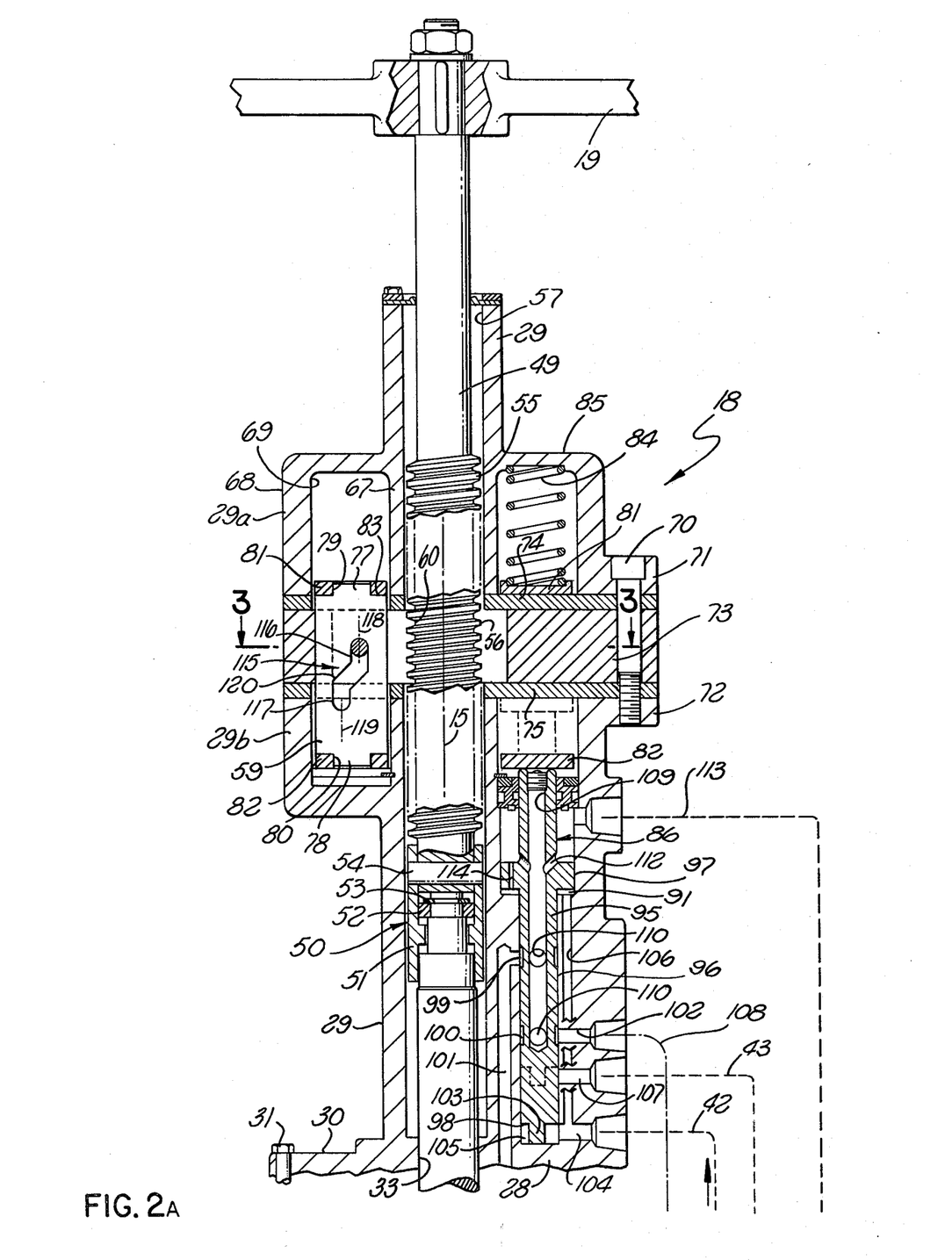
FIGS. 2A and 2B, form together an enlarged fragmentary axial sectional view through the apparatus of FIG. 1.

Referring to FIG. 2A, the manual actuator attachment 18 includes a vertical shaft 49 aligned with piston rod 32 and extending along axis 15, and which is attached at its lower end by a connection 50 to the upper end of piston rod 32 in a relation transmitting motion along axis 15 from upper shaft 49 and its connected hand wheel 19 to piston rod 32 and the connected valve stem 14. The connection 50 may include a tubular attaching part 51 which is retained on the upper end of the piston rod by a washer 52 and split ring 53, and which is connected to the lower end of shaft 49 by a transverse pin 54. Shaft 49 has an external lead screw thread 55, preferably of "ACME" configuration as seen in FIG. 2A, with the cylindrically extending major diameter surfaces 56 of this thread being a close fit within and located by an internal cylindrical surface 57 in body 29 of unit 18, to effectively journal shaft 49 for rotation and axial movement within and relative to body 29.

At different locations about axis 15, body 29 of unit 18 carries a number of circularly spaced nut segments 58a and 58b, which are movable into and out of engagement with thread 55 to control the effectiveness of the manual actuator to move valve 13. As seen best in FIG. 3, there preferably are three pairs of such nut segments, each including two segments 58a and 58b spaced apart with a coacting cam element 59 received therebetween.

Segments 58a and 58b have complementary helically aligned partial threads 60 formed at their radially inner sides engageable with the thread 55 of shaft 49. The three pairs of nut segments are movable into and out of engagement with the shaft thread and along three radially extending lines 61, 62 and 63 (FIG. 3). The two segments of each pair are rigidly interconnected by a pin 64 extending therebetween along a line 65 perpendicular to the axis 61, 62 or 63 of radial movement of that pair of nut segments, with opposite ends of the pin 65 being received within aligned openings 66 in the two segments.

Each of the three cam elements 59 forms essentially a flat plate received between the two corresponding nut segments, and having a camming slot 115 (FIG. 2A) which receives the coating pin 65 and cams that pin and the connected nut segments radially inwardly and outwardly in correspondence with axial movement of the cam elements. Each slot 115 has two opposite end portions 116 and 117 which extend along lines 118 and 119 parallel to main axis 15 of the device, with an inclined portion 120 of the slot advancing progressively radially outwardly as it extends from the first end portion 116 of the slot to the second portion 117.

As seen in FIG. 2A, the portion of the body 29 of unit 18 which contains nut segments 58a and 58b may be formed sectionally of a number of parts secured together to appropriately locate and guide those nut segments and the associated cams. More particularly, two hollow sections 29a and 29b of body 29 may be shaped to have concentric cylindrical inner and outer walls 67 and 68 forming an annular chamber 69 between those walls, the sections 29a and 29b being secured rigidly together by a series of circularly spaced bolts 70 extending through and interconnecting flanges 71 and 72 on the two parts. Axially between these flanges and the two sections 29a and 29b, there is provided an externally circular guide or locating block 73 with transverse walls 74 and 75 at opposite axial sides thereof, and with all of the parts 73, 74 and 75 being clamped between body parts 29a and 29b in the condition illustrated in FIG. 2A.

As seen in FIG. 3, block 73 contains three circularly spaced guideways 76 which open radially inwardly and which are shaped to effectively guide the three pairs of nut segments for only the desired radially inward and outward movement along lines 61, 62 and 63, and into and out of engagement with thread 55 of shaft 49. When pins 64 are received in portions 116 of cam slots 115, the threads of nut segments 58a and 58b are in engagement with shaft thread 55. When the pins are in portions 117 of slots 115, the segment threads are out of engagement with shaft thread 55.

The two walls or discs 74 and 75 engage opposite axial sides of nut segments 58a and 58b, to confine those segments against axial movement. The opposite ends of cam elements 59 project axially beyond walls 74 and 75 (FIG. 2A), and have pin ends 77 and 78 projecting into and confined and located by openings 79 and 80 in two circular end washers 81 and 82. These washers engage shoulders on the cam parts at 83 to transmit axial movement from the washers to the cam elements. Three circularly spaced coil springs 84 bear at opposite ends against an end wall 85 of housing part 29a and washer 81 to yieldingly urge the cam elements downwardly to the position represented in full lines in FIG. 2A.

The cam elements are actuated upwardly in FIG. 2A by three circularly spaced piston elements 86, 87 and 88, which are received within three circularly spaced axial bores 89 formed in body part 29b. As seen in FIG. 4, piston 87 has an enlarged piston head 90 which is adapted to be urged upwardly by reception of fluid within a chamber 91, and which has a reduced diameter shank 92 extending through an end wall 93 in sealed relation with the upper end of the piston rod bearing and exerting upward force against washer 82.

A second of the three actuating pistons, specifically, that identified by the number 88 in FIG. 3, may be identical with the piston 87 shown in FIG. 4 and described above. The third piston 86 may be constructed the same as pistons 87 and 88 except for the provision of a downwardly projecting valving portion 95 on piston 86 for controlling the flow of pressure fluid in accordance with piston movement. That portion 95 of piston 86 may have an outer surface 96 which is externally cylindrical between the location of its piston head 97 and a location 98, except for the provision of two annular fluid conducting grooves 99 and 100 which are in communication with passages 101 and 102 respectively in the FIG. 2A position of the parts. Downwardly beyond the location 98, valve portion 95 of piston 86 has a reduced diameter portion 103 allowing flow of fluid from a passage 104 into a space 105 in the FIG. 2A position of the valve element. Passage 104 is in turn connected to the previously mentioned line 42 which receives the pressurized fluid discharged by pump 40. This pressure fluid from the pump is also delivered from passage 104 to each of the chambers 91 beneath the three pistons 86, 87 and 88, with this communication being effected through body passages represented somewhat diagrammatically at 106. When piston 86 is in its uppermost position (broken lines in FIG. 2), the shoulder which is formed on valve element 95 at 98 moves beyond the lower edge of a passage 107 in the body, to place passage 107 in communication with passage 104 and deliver pressure fluid from passage 104 through space 105 and passage 107 to the previously mentioned line 43 leading to automatic control means 44, to supply actuating pressure thereto. The passage 102 in the body of the device is connected by a line 108 to lower chamber C1 of the main piston and cylinder mechanism 25, and passage 101 is connected to the upper chamber C2 of that mechanism. An internal passage 109 in the combined piston and valve device 86 communicates through openings 110 and 111 with grooves 99 and 100 in the FIG. 2A full line position of element 86, and also communicates through small bleed passages 112 with a line 113 leading fluid back to the suction reservoir 45 of the pump. Another bleed passage 114 extends through the head 97 of piston 86, and a similar bleed passage extends through each of the other pistons 87 and 88.

Figure 2B:
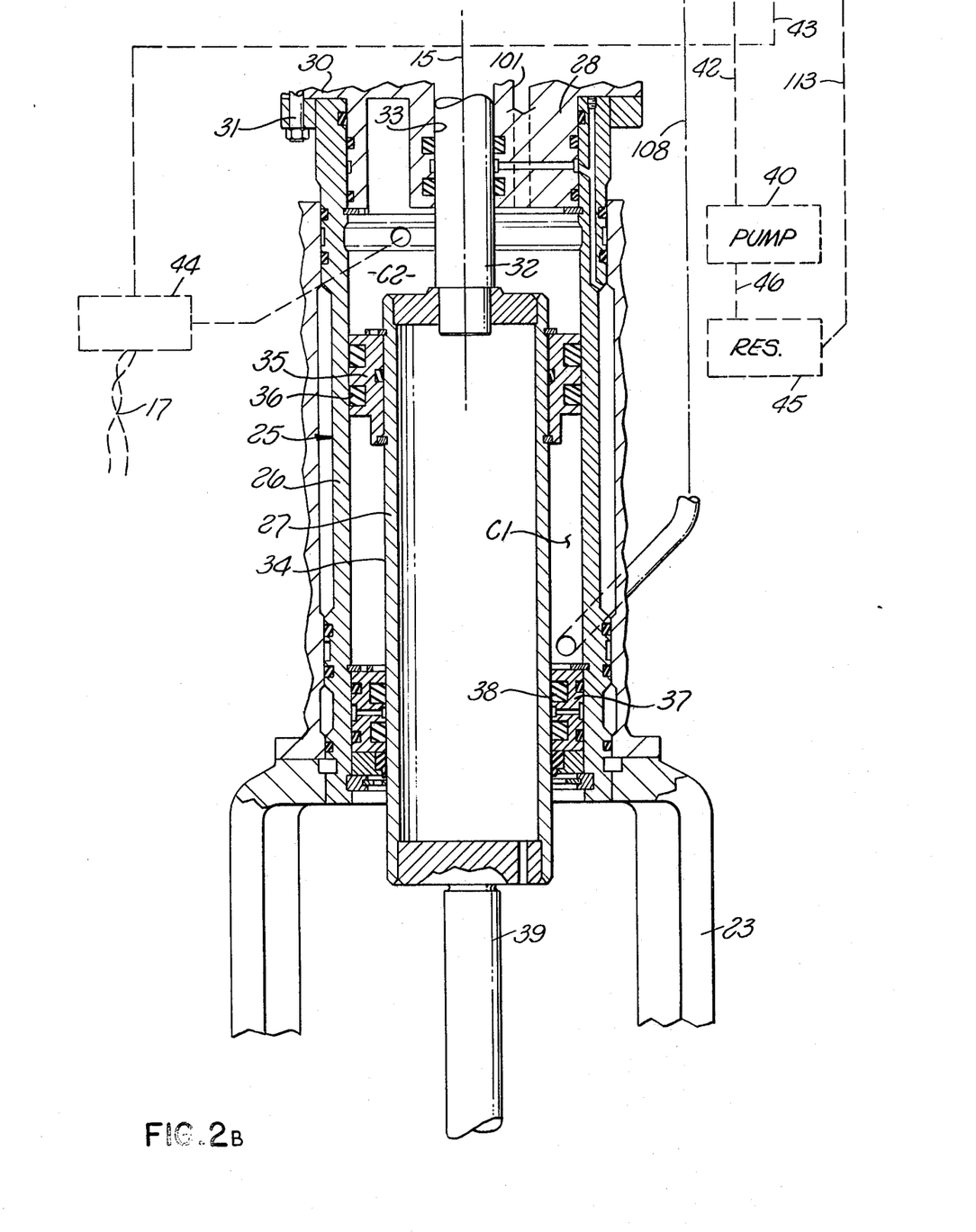

To now describe the operation of the illustrated equipment, assume that the apparatus is initially in the condition illustrated in FIGS. 2A and 2B, in which motor 41 and pump 40 are not in operation, and consequently hydraulic fluid under pressure is not being supplied to the remainder of the apparatus through line 42. Alternatively, this loss of pressure to the system might be the result of rupture of the line 42 leading from the pump to unit 18. In the absence of pressure at the undersides of the pistons 86, 87 and 88, springs 84 actuate cam elements 59 downwardly, to the FIG. 2A position, in which all six of the nut segments 58a and 58b are cammed radially inwardly into engagement with thread 55 of shaft 49. As a result, manual rotation of hand wheel 19 acts by virtue of the threaded engagement of shaft 49 with nut segments 58a and 58b to cause upward or downward movement of shaft 49 and the connected piston 27 and the valve element or other controlled part 13 attached to the lower end of the piston. Thus, an operator has full manual control over the setting of the valve element.

When pump 40 is placed in operation or pressure is otherwise resumed in line 42 leading to unit 18, this pressure is communicated by passages 106 to the undersides of pistons 86, 87 and 88, actuating them upwardly to their broken line positions of FIGS. 2A and 4, and shifting cam elements 59 upwardly to move the nut segments 58a and 58b radially outwardly and out of engagement with thread 55. During the initial portion of the upward movement of cam elements 59, pins 64 are received within the upper vertical or axial portions 116 of the slots 115, and thus the nut segments remain in the inner active positions, while grooves 99 and 100 of the valve portion 99 of piston part 86 move out of engagement with passages 101 and 102, thus breaking the communication between cylinder chambers C1 and C2 and reservoir 45 (from passages 101 and 102 through passages 109 and 112 to line 113). This communication between cylinder chambers C1 and C2 and the reservoir is maintained when the unit 18 is in its manual operating condition in order to allow fluid flow to and from chambers C1 and C2 and avoid interference with manual actuation of the piston 27 by confinement of fluid in those chambers. After grooves 99 and 100 have moved out of communication with passages 101 and 102 as a result of upward movement of part 86, cam pins 64 engage the inclined portions 120 of cam slots 115 to commence radially outward movement of the nut segments. When these nut segments reach their outermost positions, pins 64 reach the second axially extending end portion 117 of cam slots 115, to allow further axial movement of the cam elements far enough to then bring shoulder 98 of element 95 beyond the lower edge of opening 107, to pass pressure fluid from passage 104 through space 105 into passage 107 and line 43. Thus, the pressure fluid is delivered through line 43 to the automatic control mechanism 44, which then takes control to automatically move piston 27 and the connected valve element or other controlled part 13 upwardly and downwardly in correspondence with changes in the electrical signal supplied through conductors 17 as previously discussed. This automatic electrohydraulic operation of the main piston and controlled element is maintained so long as pump 40 is in operation and is supplying pressure fluid to the remainder of the apparatus through line 42.

In the event of a pressure failure in line 42, the pressure at the undersides of pistons 86, 87 and 88 gradually bleeds upwardly through passages 114 to the upper sides of the heads of those pistons, and discharges through line 113 to reservoir 45, to thus allow gradual downward movement of pistons 86, 87 and 88 and the cams 59 under the influence of springs 84. During such downward movement of the cams, pins 65 first contact the lower axial portions 117 of slots 115 while the lower portion of valve projection 95 of piston 86 moves downwardly beyond passage 107 and thus interrupts the communication between lines 42 and 43. Further downward movement of the cam elements acts through portions 120 of slots 115 to move pins 64 radially inwardly and thus return nut segments 58a and 58b into engagement with thread 55 of shaft 49. If the threads do not mesh, slight rotation of hand wheel 19 will bring the threads into alignment and permit inward movement of the nut segments. During the final portion of the downward movement of the cam elements, pins 64 are received within the upper axial portions 116 of slot 115, while grooves 99 and 100 move into communication with passages 101 and 102 respectively, to place chambers C1 and C2 of the main piston and cylinder mechanism in communication with the reservoir and thus avoid resistance to upward and downward movement of the piston which might occur if the fluid were trapped in chamber C1 or C2.

While a certain specific embodiment of the present invention has been disclosed as typical, the invention is of course not limited to this particular form, but rather is applicable broadly to all such variations as fall within the scope of the appended claims.

We claim:

1. An actuator assembly comprising:
   a fluid pressure operated unit for moving a controlled part to different positions;
   a source of pressurized fluid for said unit;
   an automatic control responsive to variations in an input signal to control the delivery of fluid under pressure from said source to said unit in a relation automatically moving said part in correspondence with said variations in the input signal;
   a manual operator for moving said part upon failure of said automatic control;
   mechanism for controlling the effectiveness of said manual operator to move said part and actuable between a first condition in which said manual operator can move said part and a second condition in which said manual operator can not move said part; and
   means automatically responsive to a change in condition of said pressure fluid source to actuate said mechanism between said two different conditions thereof in a relation rendering the effectiveness of said manual operator to control said part dependent upon the capacity of said source to provide fluid for said automatic control;
   said mechanism including two threaded elements one of which is rotatable relative to the other by said manual operator to move said part, one of said threaded elements being withdrawn laterally from engagement with the other in said second condition of said mechanism and being in threaded engagement with the other threaded element in said first condition to render the manual operator effective to move said part.

2. An actuator assembly as recited in claim 1, in which said means include means responsive to a change in the pressure of fluid from said source to actuate said mechanism between said two different conditions thereof.

3. An actuator assembly as recited in claim 1, in which said means are pressure actuated and responsive to a reduction in the pressure of fluid from said source to actuate said mechanism from said second condition thereof to said first condition in which the manual operator becomes effective to move said part.

4. An actuator assembly as recited in claim 3, in which said means are also automatically responsive to an increase in the pressure of fluid from said source to actuate said mechanism from said first condition thereof to said second condition in which the manual operator becomes ineffective to move said part.

5. An actuator assembly as recited in claim 1, in which said means are automatically responsive to an increase in the pressure of fluid from said source to actuate said mechanism from said first condition thereof to said second condition in which the manual operator cannot move said part.

6. An actuator assembly as recited in claim 1, in which said source of pressurized fluid is a motor driven pump.

7. An actuator assembly as recited in claim 1, in which said means are automatically responsive to a drop in pressure of fluid from said source to vent pressure fluid from said unit.

8. A manual actuator for use in conjunction with an automatic control which regulates the delivery of fluid under pressure from a source to a pressure operated unit in a relation automatically moving a controlled part in correspondence with variations in an input signal; said manual actuator comprising:
   a manually operated element for moving said part upon failure of said automatic control;
   mechanism for controlling the effectiveness of said manually operated element to move said part and actuable between a first condition in which said element can move said part and a second condition in which said element can not move said part; and
   means automatically responsive to a change in condition of said pressure fluid source to actuate said mechanism between said two different conditions thereof in a relation rendering the effectiveness of said manually operated element to control said part dependent upon the capacity of said source to provide fluid for said automatic control;
   said mechanism including two threaded elements one of which is rotatable relative to the other by said manually operated elements to move said part, one of said threaded elements being withdrawn laterally from engagement with the other in said second condition of said mechanism and being in threaded engagement with the other threaded element in said first condition to render the manually operated element effective to move said part.

9. A manual actuator as recited in claim 8, in which said means include means responsive to a change in the pressure of fluid from said source to actuate said mechanism between said two different conditions thereof.

10. A manual actuator as recited in claim 8, in which said means are pressure actuated and responsive to a reduction in the pressure of fluid from said source to actuate said mechanism from said second condition thereof to said first condition in which the manually operated element becomes effective to move said part.

11. A manual actuator as recited in claim 10, in which said means are also automatically responsive to an increase in the pressure of fluid from said source to actuate said mechanism from said first condition thereof to said second condition in which the manually operated element becomes ineffective to move said part.

12. A manual actuator as recited in claim 8, in which said means are automatically responsive to a drop in pressure of fluid from said source to vent pressure fluid from said unit.

13. An actuator assembly comprising:
   a fluid pressure operated unit for moving a controlled part to different positions;
   a source of pressurized fluid for said unit;
   an automatic control responsive to variations in an input signal to control the delivery of fluid under pressure from said source to said unit in a relation automatically moving said part in correspondence with said variations in the input signal;

a manual operator for moving said part upon failure of said automatic control;

mechanism for controlling the effectiveness of said manual operator to move said part and actuable between a first condition in which said manual operator can move said part and a second condition in which said manual operator can not move said part; and means automatically responsive to a change in condition of said pressure fluid source to actuate said mechanism between said two different conditions thereof in a relation rendering the effectiveness of said manual operator to control said part dependent upon the capacity of said source to provide fluid for said automatic control;

said mechanism including a shaft for actuating said part and which has an external screw thread, and a plurality of nut segments actuable by said means between positions of engagement and disengagement with said thread on said shaft.

14. An actuator assembly comprising:

a fluid pressure operated unit for moving a controlled part to different positions;

a source of pressurized fluid for said unit;

an automatic control responsive to variations in an input signal to control the delivery of fluid under pressure from said source to said unit in a relation automatically moving said part in correspondence with said variations in the input signal;

a manual operator for moving said part upon failure of said automatic control;

mechanism for controlling the effectiveness of said manual operator to move said part and actuable between a first condition in which said manual operator can move said part and a second condition in which said manual operator can not move said part; and means automatically responsive to a change in condition of said pressure fluid source to actuate said mechanism between said two different conditions thereof in a relation rendering the effectiveness of said manual operator to control said part dependent upon the capacity of said source to provide fluid for said automatic control;

said mechanism including a shaft having an external thread and at least one nut segment having a partial thread movable into and out of engagement with said thread on the shaft to actuate said mechanism between said conditions thereof, said means including means responsive to a drop in pressure of fluid from said source to actuate said nut element into engagement with said thread on the shaft.

15. An actuator assembly comprising:

a fluid pressure operated unit for moving a controlled part to different positions;

a source of pressurized fluid for said unit;

an automatic control responsive to variations in an input signal to control the delivery of fluid under pressure from said source to said unit in a relation automatically moving said part in correspondence with said variations in the input signal;

a manual operator moving said part upon failure of said automatic control;

mechanism for controlling the effectiveness of said manual operator to move said part and actuable between a first condition in which said manual operator can move said part and a second condition in which said manual operator can not move said part; and means automatically responsive to a change in condition of said pressure fluid source to actuate said mechanism between said two different conditions thereof in a relation rendering the effectiveness of said manual operator to control said part dependent upon the capacity of said source to provide fluid for said automatic control;

said mechanism including a shaft having an external thread and at least one nut segment having a partial thread movable into and out of engagement with said thread on the shaft to actuate said mechanism between said conditions thereof, said means including a cam movable axially of said shaft and operable by such axial movement to actuate said nut segment into and out of engagement with said thread on said shaft, and a fluid pressure actuated element responsive to a decrease in the pressure of fluid from said source to actuate said cam axially in a direction moving said nut segment into engagement with said thread on the shaft and thereby render said manual operator effective to move said part.

16. An actuator assembly comprising:

a fluid pressure operated unit for moving a controlled part to different positions;

a source of pressurized fluid for said unit;

an automatic control responsive to variations in an input signal to control the delivery of fluid under pressure from said source to said unit in a relation automatically moving said part in correspondence with said variations in the input signal;

a manual operator for moving said part upon failure of said automatic control;

mechanism for controlling the effectiveness of said manual operator to move said part and actuable between a first condition in which said manual operator can move said part and a second condition in which said manual operator can not move said part; and means automatically responsive to a change in condition of said pressure fluid source to actuate said mechanism between said two different conditions thereof in a relation rendering the effectiveness of said manual operator to control said part dependent upon the capacity of said source to provide fluid for said automatic control;

said mechanism including a shaft having an external thread, a plurality of nut segments disposed about said shaft and movable radially thereof between positions of engagement with and disengagement from said thread of the shaft, cam means movable axially of said shaft and operable by such movement to shift said nut segments into and out of engagement with said thread on the shaft, spring means urging said cam means axially in a direction to shift said nut segments into engagement with the thread on said shaft, and piston means exposed to the pressure of fluid from said source and urging said cam means against the tendency of said spring means and in a direction to shift said nut elements radially outwardly away from engagement with said thread of said shaft as long as said pressure from said source is maintained.

17. An actuator assembly as recited in claim 16, including valve means operable to automatically close off the delivery of pressure fluid from said source to said automatic control upon actuation of said cam means by said spring means in a direction moving said nut segments into engagement with said thread on said shaft.

18. An actuator assembly as recited in claim 17, including valve means movable with said piston means and operable to automatically discharge pressure fluid from said unit upon spring induced movement of said cam means in a direction to actuate said nut segments into engagement with said thread on said shaft.

19. An actuator assembly as recited in claim 16, including valve means operable to automatically discharge pressure fluid from said unit upon spring induced movement of said cam means in a direction to actuate said nut segments into engagement with said thread on said shaft.

20. An actuator assembly comprising:
a fluid pressure operated unit for moving a controlled part to different positions;
a source of pressurized fluid for said unit;
an automatic control responsive to variations in an input signal to control the delivery of fluid under pressure from said source to said unit in a relation automatically moving said part in correspondence with said variations in the input signal;
a manual operator for moving said part upon failure of said automatic control;
mechanism for controlling the effectiveness of said manual operator to move said part and actuable between a first condition in which said manual operator can move said part and a second condition in which said manual operator can not move said part;
means automatically responsive to a change in condition of said pressure fluid source to actuate said mechanism between said two different conditions thereof in a relation rendering the effectiveness of said manual operator to control said part dependent upon the capacity of said source to provide fluid for said automatic control; and
means automatically operable upon actuation of said mechanism to said first condition thereof to close off a fluid passage through which pressure fluid flows from said source to said automatic control.

21. An actuator assembly comprising:
a fluid pressure operated unit for moving a controlled part to different positions;
a source of pressurized fluid for said unit;
an automatic control responsive to variations in an input signal to control the delivery of fluid under pressure from said source to said unit in a relation automatically moving said part in correspondence with said variations in the input signal;
a manual operator for moving said part upon failure of said automatic control;
mechanism for controlling the effectiveness of said manual operator to move said part and actuable between a first condition in which said manual operator can move said part and a second condition in which said manual operator can not move said part; and
means automatically responsive to a change in condition of said pressure fluid source to actuate said mechanism between said two different conditions thereof in a relation rendering the effectiveness of said manual operator to control said part dependent upon the capacity of said source to provide fluid for said automatic control;
said means including spring means yieldingly urging said mechanism to said first condition thereof, a plurality of piston elements urged by the pressure of fluid from said source in a direction to actuate said mechanism to said second condition thereof against the tendency of said spring means, one of said piston elements having a first valving portion acting to automatically close off a passage through which fluid from said source flows to said automatic control upon a decrease in said pressure from said source, and said one piston element having an additional valving portion operable to automatically open vents from said unit to a reservoir upon movement of said one piston element responsive to said decrease in pressure of fluid from said source.

22. A manual actuator for use in conjunction with an automatic control which regulates the delivery of fluid under pressure from a source to a pressure operated unit in a relation automatically moving a controlled part in correspondence with variations in an input signal;
said manual actuator comprising:
a manually operated element for moving said part upon failure of said automatic control;
mechanism for controlling the effectiveness of said manually operated element to move said part and actuable between a first condition in which said element can move said part and a second condition in which said element can not move said part; and
means automatically responsive to a change in condition of said pressure fluid source to actuate said mechanism between said two different conditions thereof in a relation rendering the effectiveness of said manually operated element to control said part dependent upon the capacity of said source to provide fluid for said automatic control;
said mechanism including a shaft having an external thread and at least one nut segment having a partial thread movable into and out of engagement with said thread on the shaft to actuate said mechanism between said conditions thereof, said means including means responsive to a drop in pressure of fluid from said source to actuate said nut element into engagement with said thread on the shaft.

23. A manual actuator for use in conjunction with an automatic control which regulates the delivery of fluid under pressure from a source to a pressure operated unit in a relation automatically moving a controlled part in correspondence with variations in an input signal;
said manual actuator comprising:
a manually operated element for moving said part upon failure of said automatic control;
mechanism for controlling the effectiveness of said manually operated element to move said part and actuable between a first condition in which said element can move said part and a second condition in which said element can not move said part; and
means automatically responsive to a change in condition of said pressure fluid source to actuate said mechanism between said two different conditions thereof in a relation rendering the effectiveness of said manually operated element to control said part dependent upon the capacity of said source to provide fluid for said automatic control;
said mechanism including a shaft having an external thread and at least one nut segment having a partial thread movable into and out of engagement with said thread on the shaft to actuate said mechanism between said conditions thereof, said means including a cam movable axially of said shaft and operable by such axial movement to actuate said nut segment into and out of engagement with said thread on said shaft, and a fluid pressure actuated element responsive to a decrease in the pressure of fluid from said source to actuate said cam axially in a direction moving said nut segment into engagement with said thread on the shaft and thereby render said manually operated element effective to move said part.

24. A manual actuator for use in conjunction with an automatic control which regulates the delivery of fluid under pressure from a source to a pressure operated unit in a relation automatically moving a controlled part in correspondence with variations in an input signal;

said manual actuator comprising:
a manually operated element for moving said part upon failure of said automatic control;
mechanism for controlling the effectiveness of said manually operated element to move said part and actuable between a first condition in which said element can move said part and a second condition in which said element can not move said part; and
means automatically responsive to a change in condition of said pressure fluid source to actuate said mechanism between said two different conditions thereof in a relation rendering the effectiveness of said manually operated element to control said part dependent upon the capacity of said source to provide fluid for said automatic control;
said mechanism including a shaft having an external thread, a plurality of nut segments disposed about said shaft and movable radially thereof between positions of engagement with and disengagement from said thread on the shaft, cam means movable axially of said shaft and operable by such movement to shift said nut segments into and out of engagement with said thread on the shaft, spring means urging said cam means axially in a direction to shift said nut segments into engagement with the thread on said shaft, and piston means exposed to the pressure of fluid from said source and urging said cam means against the tendency of said spring means and in a direction to shift said nut segments radially outwardly away from engagement with said thread on said shaft as long as said pressure from said source is maintained.

25. A manual actuator as recited in claim 24, including valve means operable to automatically close off the delivery of pressure fluid from said source to said automatic control upon actuation of said cam means by said spring means in a direction moving said nut segments into engagement with said thread on said shaft.

26. A manual actuator as recited in claim 25, including valve means movable with said piston means and operable to automatically discharge pressure fluid from said unit upon spring induced movement of said cam means in a direction to actuate said nut segments into engagement with said thread on said shaft.

27. A manual actuator for use in conjunction with an automatic control which regulates the delivery of fluid under pressure from a source to a pressure operated unit in a relation automatically moving a controlled part in correspondence with variations in an input signal;

said manual actuator comprising:
a manually operated element for moving said part upon failure of said automatic control;
mechanism for controlling the effectiveness of said manually operated element to move said part and actuable between a first condition in which said element can move said part and a second condition in which said element can not move said part;
means automatically responsive to a change in condition of said pressure fluid source to actuate said mechanism between said two different conditions thereof in a relation rendering the effectiveness of said manually operated element to control said part dependent upon the capacity of said source to provide fluid for said automatic control; and
means automatically operable upon actuation of said mechanism to said first condition thereof to close off a fluid passage through which pressure fluid flows from said source to said automatic control.

28. A manual actuator for use in conjunction with an automatic control which regulates the delivery of fluid under pressure from a source to a pressure operated unit in a relation automatically moving a controlled part in correspondence with variations in an input signal;

said manual actuator comprising:
a manually operated element for moving said part upon failure of said automatic control;
mechanism for controlling the effectiveness of said manually operated element to move said part and actuable between a first condition in which said element can move said part and a second condition in which said element can not move said part; and
means automatically responsive to a change in condition of said pressure fluid source to actuate said mechanism between said two different conditions thereof in a relation rendering the effectiveness of said manually operated element to control said part dependent upon the capacity of said source to provide fluid for said automatic control;
said means including spring means yieldingly urging said mechanism to said first condition thereof, a plurality of piston elements urged by the pressure of fluid from said source in a direction to actuate said mechanism to said second condition thereof against the tendency of said spring means, one of said piston elements having a first valving portion acting to automatically close off a passage through which fluid from said source flows to said automatic control upon a decrease in said pressure from said source, and said one piston element having an additional valving portion operable to automatically open vents from said unit to a reservoir upon movement of said one piston element responsive to said decrease in pressure of fluid from said source.

* * * * *